United States Patent
Lindberg et al.

(10) Patent No.: US 11,442,852 B2
(45) Date of Patent: Sep. 13, 2022

(54) ADAPTIVE CONTEXT METADATA MESSAGE FOR OPTIMIZED TWO-CHIP PERFORMANCE

(71) Applicant: WESTERN DIGITAL TECHNOLOGIES, INC., San Jose, CA (US)

(72) Inventors: Todd Lindberg, Phoenix, AZ (US); Robert Ellis, Phoenix, AZ (US); Kevin O'Toole, Chandler, AZ (US); Vivek Shivhare, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 40 days.

(21) Appl. No.: 16/911,787

(22) Filed: Jun. 25, 2020

(65) Prior Publication Data

US 2021/0406165 A1    Dec. 30, 2021

(51) Int. Cl.
| | |
|---|---|
| *G06F 12/02* | (2006.01) |
| *G06F 12/08* | (2016.01) |
| *G06F 12/0873* | (2016.01) |
| *G06F 13/16* | (2006.01) |
| *G06F 9/38* | (2018.01) |

(52) U.S. Cl.
CPC ........ *G06F 12/0246* (2013.01); *G06F 9/3877* (2013.01); *G06F 12/0873* (2013.01); *G06F 13/1668* (2013.01); *G06F 2212/7201* (2013.01)

(58) Field of Classification Search
CPC .. G06F 12/0246; G06F 3/0679; G06F 9/3877; G06F 12/0873; G06F 13/1668; G06F 2212/7201; G06F 9/30192; G06F 2213/2802
See application file for complete search history.

(56) References Cited

U.S. PATENT DOCUMENTS 5,842,038 A * 11/1998 Williams ............ G06F 13/1642
                                                710/5
8,296,505 B2  10/2012 Min et al.
(Continued)

OTHER PUBLICATIONS

EFM32 Direct Memory Access AN0013 (Year: 2013).*
(Continued)

*Primary Examiner* — Paul M Knight
(74) *Attorney, Agent, or Firm* — ArentFox Schiff LLP

(57) ABSTRACT

Aspects of a storage device including a master chip controller and a slave chip processor and memory including a plurality of memory locations are provided which allow for simplified processing of descriptors associated with host commands in the slave chip based on an adaptive context metadata message from the master chip. When the controller receives a host command, the controller in the master chip provides to the processor in the slave chip a descriptor associated with a host command, an instruction to store the descriptor in the one of the memory locations, and the adaptive context metadata message mapping a type of the descriptor to the one of the memory locations. The processor may then process the descriptor stored in the one of the memory locations based on the message, for example, by refraining from identifying certain information indicated in the descriptor. Reduced latency in command execution may thereby result.

18 Claims, 7 Drawing Sheets

(56) References Cited

U.S. PATENT DOCUMENTS

| | | | |
|---|---|---|---|
| 8,606,184 B1* | 12/2013 | Luthra | H04W 16/14 455/296 |
| 9,189,385 B2 | 11/2015 | Cohen et al. | |
| 9,652,311 B2 | 5/2017 | Allen et al. | |
| 9,977,760 B1* | 5/2018 | Diehl | G06F 15/17331 |
| 10,140,036 B2 | 11/2018 | Kelner et al. | |
| 2005/0071570 A1* | 3/2005 | Takasugl | G06F 12/0862 711/137 |
| 2005/0204094 A1* | 9/2005 | Rotithor | G06F 13/1668 711/167 |
| 2008/0235493 A1 | 9/2008 | Fortier | |
| 2009/0238001 A1* | 9/2009 | Redaelli | G11C 7/10 365/185.17 |
| 2014/0095855 A1* | 4/2014 | Huynh | G06F 9/00 711/E12.008 |
| 2014/0173700 A1* | 6/2014 | Awan | H04L 63/101 726/4 |
| 2016/0253266 A1* | 9/2016 | Park | G06F 12/0238 711/154 |
| 2016/0277151 A1* | 9/2016 | Xu | G11C 19/30 |
| 2016/0291868 A1* | 10/2016 | Halaharivi | G06F 12/0246 |
| 2016/0357481 A1* | 12/2016 | Nam | G06F 3/061 |
| 2017/0090752 A1* | 3/2017 | Wakchaure | G06F 3/064 |
| 2017/0286507 A1* | 10/2017 | Hosogi | G06F 16/256 |
| 2018/0107619 A1 | 4/2018 | Singh et al. | |
| 2019/0006379 A1* | 1/2019 | Kanno | G06F 3/0644 |
| 2019/0286370 A1* | 9/2019 | Lee | G06F 3/061 |
| 2020/0042225 A1* | 2/2020 | Oh | G06F 3/061 |
| 2020/0089566 A1* | 3/2020 | You | G11C 11/1675 |
| 2020/0192815 A1* | 6/2020 | Lee | G06F 12/1009 |
| 2020/0301586 A1* | 9/2020 | Kim | G06F 11/1068 |
| 2020/0356295 A1* | 11/2020 | Shen | G06F 3/0676 |

OTHER PUBLICATIONS

What Is an SoC? A Basic Definition by Harding; Tom's Hardware (Year: 2019).*

Implementation Strategy for Downgraded Flash-Memory Storage Devices by Hseih (Year: 2013).*

International Search Report and Written Opinion issued for Int'l Appl. No. PCT/US2021/020095, dated Jun. 17, 2021; 9 pages.

* cited by examiner

ADAPTIVE CONTEXT METADATA MESSAGE FOR OPTIMIZED TWO-CHIP PERFORMANCE

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

The flash storage device may be implemented in a two-chip system including a master chip and a slave chip. The master chip may be a front-end chip of the flash storage device that interfaces with a host device and generates messages in response to host commands. The slave chip may be a back-end or flash management chip of the flash storage device that receives and processes the messages from the front-end and interfaces with the flash memory to read and write data associated with host commands.

For instance, when reading data from cells of the flash memory in response to a read command from a host device, a controller of the flash storage device (e.g. in the master chip) may identify the physical address of a block associated with a logical address. A processor in the flash storage device (e.g. in the slave chip) may receive a message including the physical address from the controller, and the processor may send a command to a die including the identified physical address to sense the data in the block into data latches. Similarly, when writing data to cells of the flash memory in response to a write command from the host device, the controller (e.g. in the master chip) may identify the physical address of a block associated with a logical address, and transfer a message including the physical address to the processor. The processor (e.g. in the slave chip) may then send a command to a die including the identified physical address to program the data from the data latches in the block.

SUMMARY

One aspect of a storage device is disclosed herein. The storage device includes a processor, a memory including a plurality of memory locations, and a controller. The controller is configured to provide to the processor, a descriptor associated with a host command, and a message mapping a type of the descriptor to one of the memory locations.

Another aspect of a storage device is disclosed herein. The storage device includes a processor, a memory including a plurality of memory locations, and a controller. The controller is configured to provide to the processor a message mapping a type of a descriptor to one of the memory locations. The processor is configured to process the descriptor in the one of the memory locations based on the message, the descriptor being associated with a host command.

A further aspect of a storage device is disclosed herein. The storage device includes a processor, a memory including a plurality of memory locations, and a controller. The controller is configured to provide to the processor, a message mapping a type of a descriptor to one of the memory locations, and an instruction to store the descriptor in the one of the memory locations.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
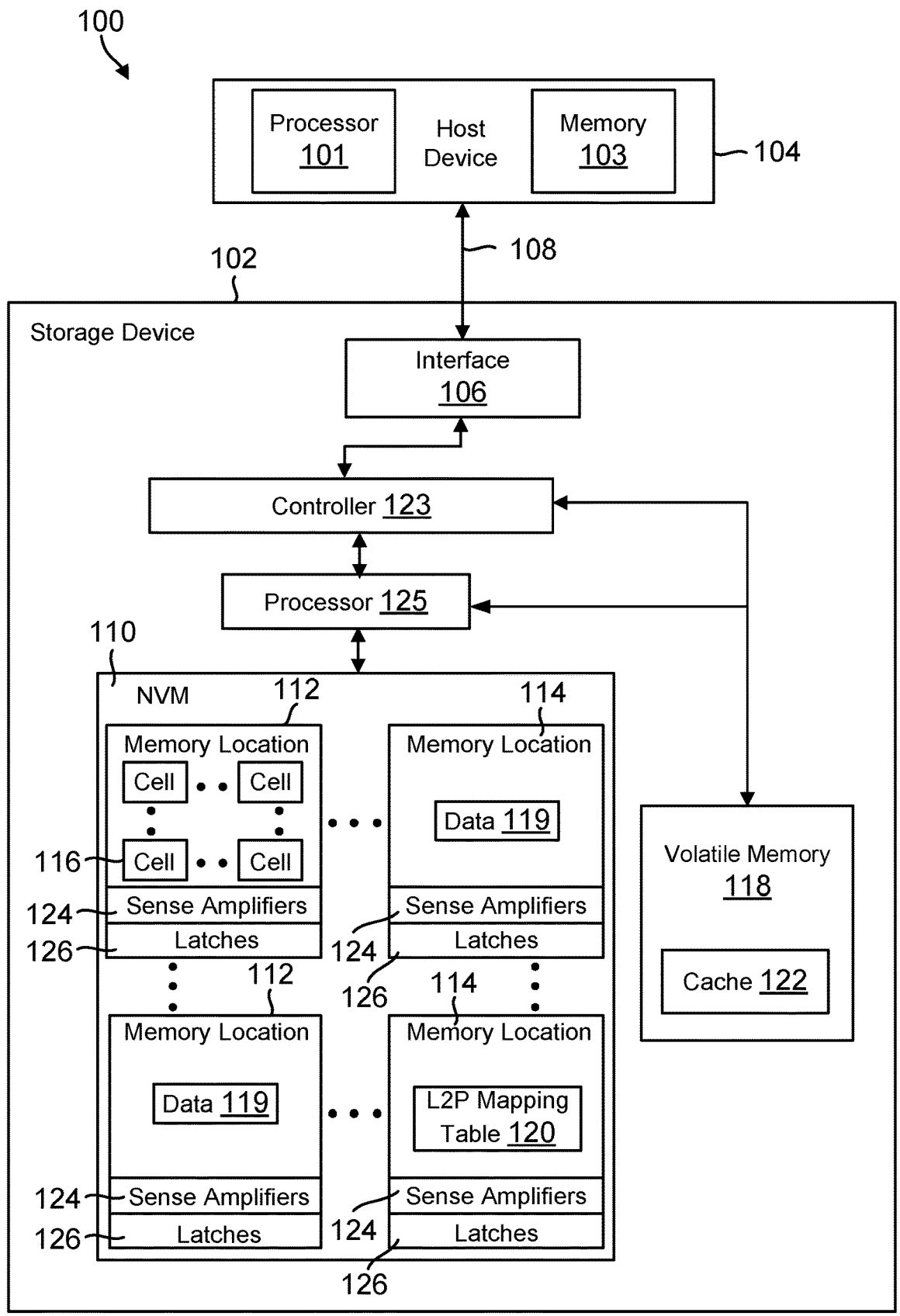
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs (including embedded SSDs or eSSDs) and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a controller of the storage device reads or writes data in memory in response to a host command, for example, in cells of a die, the controller may issue a command to the die to respectively sense or program the data in the cells. For instance, when the storage device is implemented using a two-chip system (e.g. a master chip and a slave chip), a controller in the master chip may construct and send a descriptor identifying information associated with the host command to a processor in the slave chip, which in turn processes the message and accordingly sends a command to the die to sense or program the data in the cells. For example, the descriptor may include an opcode indicating that the host command is a read command and include a physical address corresponding to a block from which the data is to be read. Alternatively, the descriptor may include an opcode indicating that the host command is a write command and include a physical address corresponding to a block in which the data is to be programmed. The descriptor may also include other information associated with the host command, such as an address of a logical page buffer in the master chip to store read data, a scatter gather list identifying different sources (e.g. buffers in the master chip) and targets (e.g. dies) for storing respective write data, and low density parity check (LDPC) parameters for error correction (e.g. that the processor may use to identify LDPC codes).

When the controller receives multiple host commands, the controller may construct and send a descriptor for each command to the processor to be temporarily stored in volatile memory, as well as a mailbox message indicating a location in the volatile memory where the descriptor is stored. During execution of each host command, the processor may obtain a corresponding descriptor from the volatile memory (e.g. as indicated in the corresponding mailbox message), and the processor may process the descriptor by identifying (e.g. parsing) the information in the descriptor and constructing and sending a command to one or more dies to perform operations (e.g. sense, program, etc.) accordingly. For instance, the processor may identify the opcode, physical address, LDPC parameters, and other information from the descriptor, and execute the host command by reading data, writing data, generating LDPC codes based on the LDPC parameters, etc. accordingly based on the descriptor.

The messages (e.g. descriptors) may include static information that is common across various descriptors. For example, each descriptor that is associated with a read command may include a same opcode (corresponding to a read), and each descriptor that is associated with a write command may include another same opcode (corresponding to a write). In another example, each descriptor may include identical LDPC parameters, logical page buffer addresses, or other static information. As a result, when the controller in the master chip constructs and transfers individual descriptors to the slave chip, and when the processor in the slave chip stores and processes individual descriptors in the volatile memory, redundant information may be repeatedly constructed, transferred, stored, and/or processed. As a result, significant latency in executing host commands may result. For example, the controller or processor may inefficiently identify or read the same opcodes for multiple descriptors, generate the same LDPC codes for various descriptors, or perform other duplicative operations inefficiently increasing the time required to complete various host commands.

To optimize performance in a two-chip system, the controller in the master chip may instruct the slave chip (e.g. a static memory or SRAM) to store descriptors with different descriptor types in different locations of the volatile memory (effectively subdividing the volatile memory). For example, the controller may send instructions to the processor to store each descriptor in different memory segments of the volatile memory depending on whether the descriptor is a read descriptor or a write descriptor. For instance, if a descriptor is associated with a read command (e.g. a read descriptor type), the controller may instruct the processor to store the descriptor in one of multiple consecutive memory segments in one subdivision of the volatile memory, while if the descriptor is associated with a write command (e.g. a write descriptor type), the controller may instruct the processor to store the descriptor in one of other consecutive memory segments in another subdivision of the volatile memory.

However, without coordination of such subdivisions between the controller in the master chip and the processor in the slave chip, performance may not be optimized. For instance, as described above, when the controller instructs the processor to store descriptors in selected memory segments, the memory segments may be selected based on descriptor type from the perspective of the master chip. However, from the perspective of the slave chip, the instructions may merely identify memory segments regardless of descriptor type, and therefore the processor may consider the memory segments to be selected based on arbitrary logic. As a result, the processor may obtain and process descriptors independently of descriptor type irrespective of the controller's subdivision of memory (e.g. based on reads and writes). For instance, the processor may parse each descriptor for read and write information including LDPC parameters independently of whether the descriptor is a read type or a write type, or the processor may perform modifications or construct additional data structures based on the information in the descriptors regardless of descriptor type (e.g., creating LDPC codes based on the LDPC parameters). Moreover, the processor may not consider whether a current descriptor corresponds to the same operation (e.g. read or write) as a previously processed descriptor. Thus, the processor may repeatedly obtain or re-generate static information (e.g. read opcodes, write opcodes, logical page buffers, LDPC parameters, etc.) common to multiple descriptors, rather than identifying the static information once from a single descriptor.

To provide coordination between master and slave chips of the above-described subdivisions, the storage device described in the present disclosure allows the controller to construct and provide to the processor an adaptive context metadata message that maps one or more descriptor types to one or more memory segments of the volatile memory. This message may map context metadata (e.g. descriptor types) to the one or more memory segments of the volatile memory in the slave chip adaptively based on a workload of the storage device (e.g. including more memory segments for read descriptors in a read-intensive workload or more memory segments for write descriptors in a write-intensive workload). The controller may provide the message to the processor during initialization of the storage device, prior to providing the processor any descriptors in response to host commands. The message may include a range count indicating a number of descriptor types (or a number of ranges of memory segments), an opcode corresponding to each descriptor type in the range count (e.g. read, write, erase, etc.), and a range of indices indicating the memory segments associated with each opcode.

For instance, assume in one example that the controller intends to execute four read commands and two write commands. The controller may subdivide six memory segments or slots of the volatile memory in the slave chip such that the first four memory segments (e.g. corresponding to indices 0-3) are to store read descriptors associated with the four read commands, and such that the last two memory segments (e.g. corresponding to indices 4-5) are to store write descriptors associated with the two write commands. To coordinate this intention with the slave chip in this example, the controller may construct and provide to the processor an adaptive context metadata message with the following values: a range count of 2 (one for the read descriptors and one for the write descriptors), a first opcode corresponding to each read command, a first range of indices 0-3 associated with the first opcode, a second opcode corresponding to each write command, and a second range of indices 4-5 associated with the second opcode. Although the above example refers to the controller subdividing six memory segments of the volatile memory such that four segments store different read descriptors and two segments store different write descriptors, the controller may subdivide the volatile memory differently in other examples. For instance, the controller may subdivide the volatile memory into different amounts of memory segments (e.g. up to 1000 or some other maximum number of memory segments in the SRAM), and/or according to different descriptor types (e.g. 500 memory segments for storing read descriptors and 500 memory segments for storing write descriptors, or some other combinations).

As a result, the processor may consider the descriptor types when obtaining and processing descriptors from the volatile memory in the execution of host commands. For example, the processor may determine from the adaptive context metadata message that several memory segments may include the same descriptor type (e.g. read). Therefore, when the processor obtains a descriptor from one of these memory segments and processes the descriptor as described above, the processor may refrain from reading fields of the descriptor such as the opcode, logical page buffer address, LDPC parameters, or other static information if the processor has identified such information from a previous descriptor of the same descriptor type in another one of these memory segments. For instance, after reading a first read descriptor and obtaining static memory from that descriptor, the processor may store in volatile memory the static information and refer to that information again when processing subsequent read descriptors. The processor may operate similarly for write descriptors or other descriptor types. Similarly, the controller may consider the descriptor types when constructing and transmitting descriptors associated with received host commands. For example, when the controller constructs a descriptor for storage in one of the memory segments and transmits the descriptor to the processor as described above, the controller may refrain from populating fields of the descriptor such as the opcode, logical page buffer address, LDPC parameters, or other static information if the controller has identified and included such information in a previous descriptor of the same descriptor type.

Consequently, the processor may read static information such as LDPC parameters in each descriptor or generate LDPC codes or other information based on each descriptor once during the current up-time of the storage device, rather than repeatedly for each host command. Moreover, the controller may avoid constructing and transmitting duplicate information to the processor for each descriptor. Therefore, the latency in executing multiple commands may be reduced and performance of the storage device improved.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer (e.g. a write buffer or a read buffer) for temporarily storing data. While FIG. 1 illustrates the volatile memory 118 as being remote from a controller 123 and a processor 125 of the storage device 102, the volatile memory 118 may be integrated into the controller 123 and/or the processor 125. Moreover, while FIG. 1 illustrates a single volatile memory in the storage device, there may be multiple volatile memories 118. For instance, one volatile memory may be coupled to the controller and another volatile memory may be coupled to the processor.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
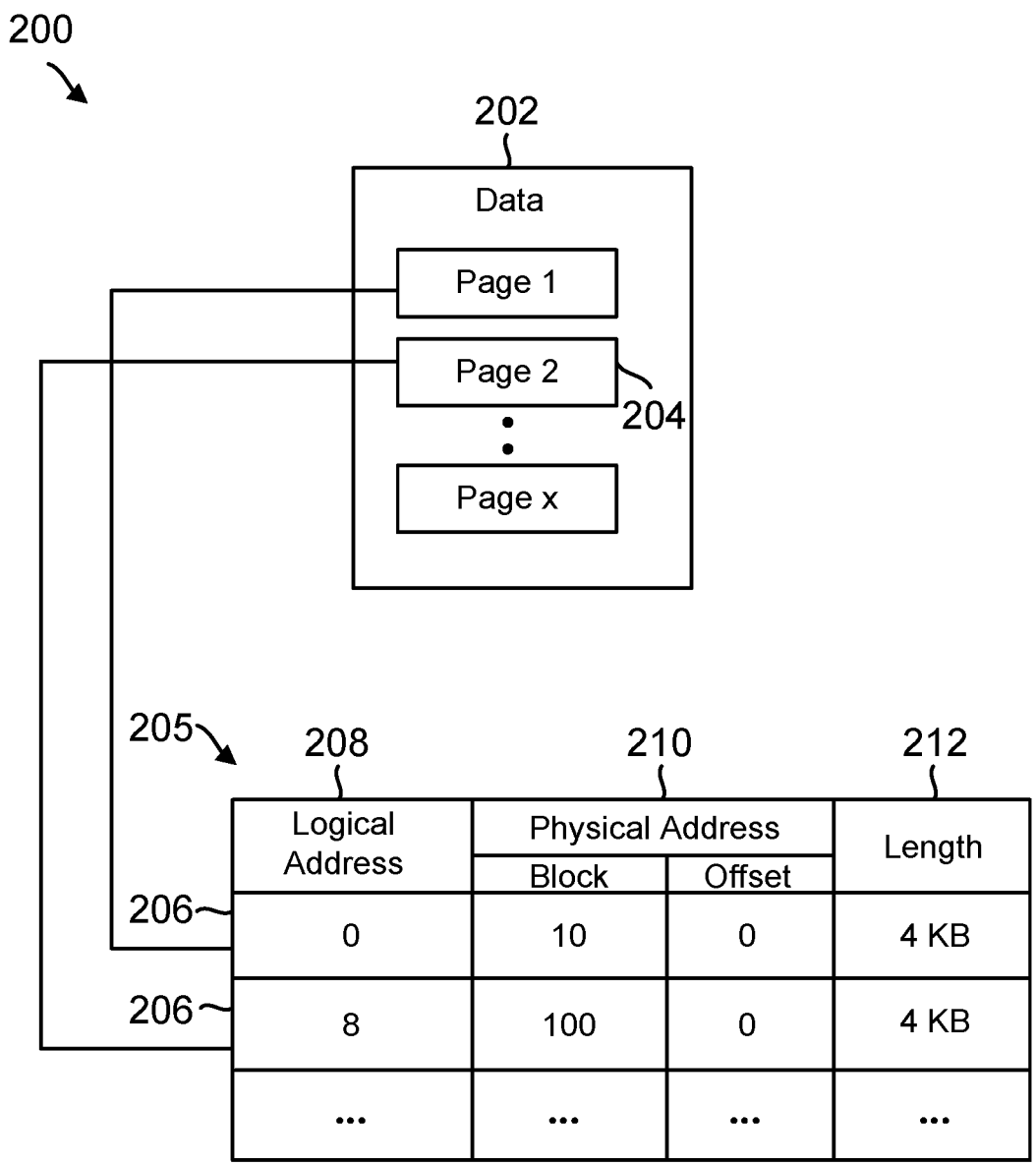
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the processor 125 and/or controller 123, after which the data may be stored in the volatile memory 118 until it is transferred to the host device 104. When data is written to the cells 116 of the memory location 112, the controller 123 and/or processor 125 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. The storage device 102 also includes a processor 125 which includes circuitry for executing instructions and can similarly include a microcontroller, a DSP, an ASIC, a FPGA, hard-wired logic, analog circuitry and/or a combination thereof. The controller 123 may be in a separate chip than the processor 125. For example, the controller 123 may be in a master chip, and the processor 125 may be in a slave chip, where the master chip and the slave chip communicate data over a bus. Alternatively in another example, the controller 123 and processor 125 may be in a single chip.

The controller 123 may be configured to perform front-end (FE) operations of the storage device 102, such as receiving host commands and data from the host device 104 (via interface 106), translating logical addresses to physical addresses, constructing messages and instructions for executing a host command, and transmitting data to the host device 104. The processor 125 may be configured to perform back-end or flash management (FM) operations of the storage device 102, such as receiving messages, data, and instructions from the controller 123 for executing a host command, constructing and sending operational commands (e.g. sense commands, program commands, status commands, etc.) to the NVM 110 (e.g. dies 114), and transmitting data to the controller 123 to complete a host command. As an example, when processing a read command, the controller 123 may be configured to send an instruction to the processor 125 to receive data from one or more of the cells 116 of the various memory locations 112, and the processor 125 may be configured to activate the sense amplifiers 124 to sense the data from the cells 116 into data latches 126 and transfer the data to the controller 123. For instance, the controller 123 may read the data 119 by sending a message (e.g. a read descriptor) to the processor 125, which in turn may send a sense command to a memory location 112 (e.g. die 114) to activate the sense amplifiers 124 and sense the data from cells 116 into data latches 126, and the controller 123 may receive the data from the data latches 126 via the processor 125. In another example, when processing a write command, the controller 123 may be configured to send an instruction to the processor 125 to program data in one or more of the cells 116 of the various memory locations 112, and the processor 125 may be configured to send the data to the data latches 126 to be transferred into the cells. For instance, the controller 123 may write the data 119 by sending data and a message (e.g. a write descriptor) to the processor 125, which in turn may send the data to the data latches 126 along with a program command to program the data into the cells 116. In a further example, the controller 123 may be configured to access the L2P mapping table 120 in the NVM 110 when reading or writing data to the cells 116. For example, the controller 123 may receive logical-to-physical address mappings from the NVM 110 (e.g. via the processor 125) in response to read or write commands from the host device 104, identify the physical addresses mapped to the logical addresses identified in the commands (e.g. translate the logical addresses into physical addresses), and access or store data in the cells 116 located at the mapped physical addresses (e.g. via the processor 125).

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

Similarly, the processor 125 and its components may be implemented with embedded software that performs the various functions of the processor described throughout this disclosure. Alternatively, software for implementing each of the aforementioned functions and components may be stored in the NVM 110 or in a memory external to the storage device 102 or host device 104, and may be accessed by the processor 125 for execution by the processor. Alternatively, the functions and components of the processor may be implemented with hardware, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller 123 and/or processor 125 allocates a memory location 112 in the NVM 110 of storage device 102 for storing the data. The controller 123 and/or processor 125 stores the L2P mapping in the NVM (and the cache 122) to map a logical address associated with the data to the physical address of the memory location 112 allocated for the data.

The controller and/or processor also stores the length of the L2P mapped data. The controller 123 and/or processor 125 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 and/or processor 125 accesses the L2P mapping in the cache 122 or otherwise the NVM to translate the logical addresses specified in the read command to the physical addresses indicating the location of the data. The controller 123 and/or processor 125 then reads the requested data from the memory location 112 specified by the physical addresses by sensing the data using the sense amplifiers 124 and storing them in data latches 126 until the read data is returned to the host 104 via the host interface 106.

Figure 3:
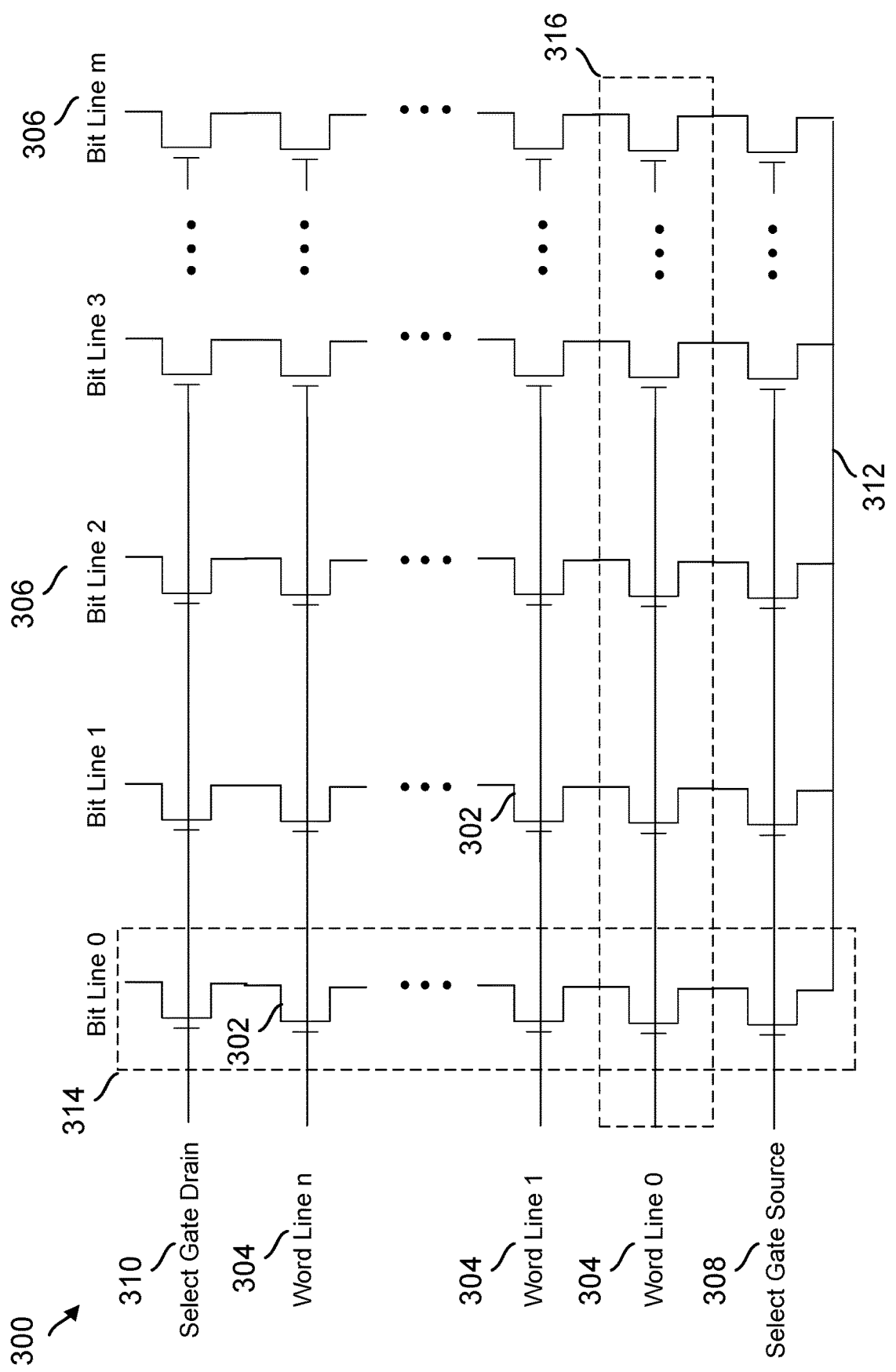
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-$n$ may each be associated with their own row address (e.g. word line 0 may correspond to word line address 0, word line 1 may correspond to word line address 1, etc.), and bit lines 0-$m$ may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
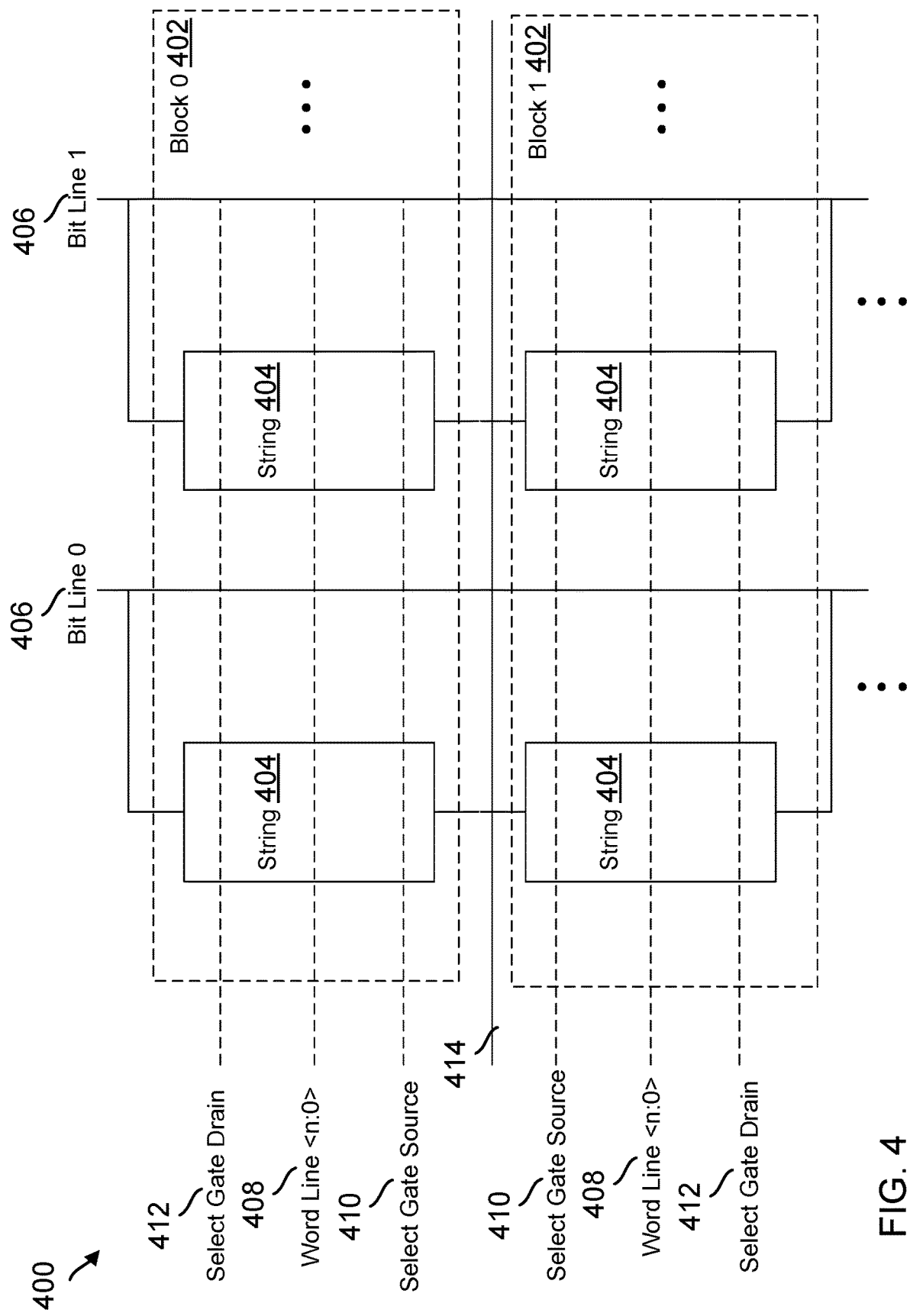
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may instruct the processor 125 to send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 and/or processor 125 may determine that the cell stores a logic '1', while if the threshold voltage of the cell 302 is larger than the read voltage (i.e. current does not flow through the cell in response the read voltage), the controller 123 and/or processor 125 may determine that the cell stores a logic '0'. Similarly, during an SLC program operation, the controller 123 may store a logic '0' by instructing the processor 125 to send a command to apply the program voltage to the cell 302 on the word line 304, 408 until the cell reaches the threshold voltage, and during an erase operation, the controller may instruct the processor to send a command to apply an erase voltage to the block 402 including the cells 302 (e.g. to a substrate of the cells such as a p-well) until the cells reduce back below the threshold voltage (back to logic '1').

Figure 5:
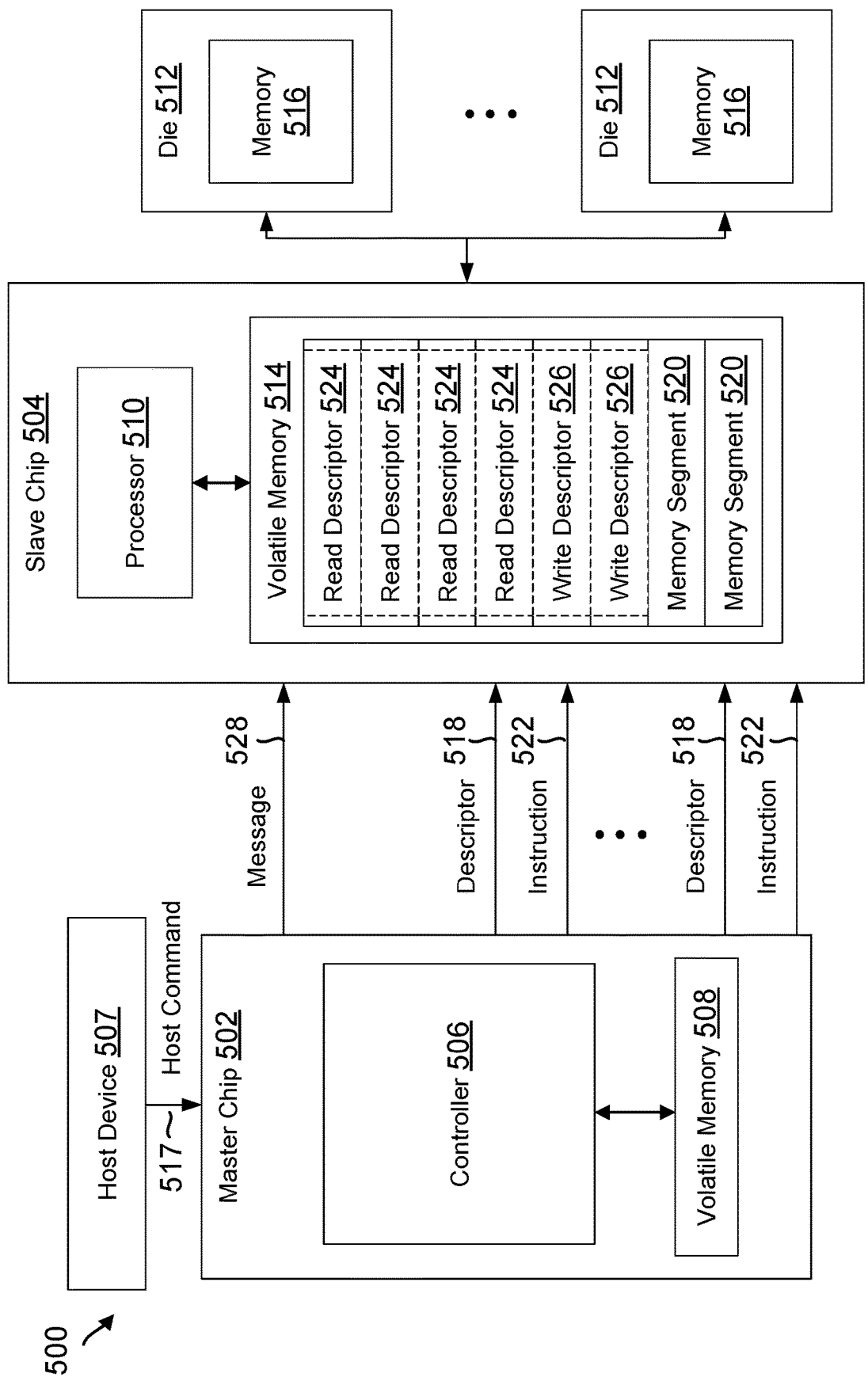
FIG. 5 is a conceptual diagram illustrating an example of the storage device of FIG. 1 as implemented in a two-chip system.

FIG. 5 illustrates an example 500 of the storage device 102 including a master chip 502 and a slave chip 504. The master chip 502 may include a controller 506 in communication with a host device 507 and coupled to a volatile memory 508, and the slave chip 504 may include a processor 510 in communication with the controller 506 and with multiple dies 512 and coupled to a volatile memory 514 (e.g. an SRAM). Each die 512 may include a memory 516, and each memory may include blocks (e.g. blocks 402) including multiple cells (e.g. cells 116, 302). The dies 512 may correspond to the memory locations 112 or dies 114 of FIG. 1. The host device 507 may correspond to host device 104 of FIG. 1. The controller 506 may correspond to controller 123 of FIG. 1. The volatile memory 508 and/or volatile memory 514 may correspond to volatile memory 118 of FIG. 1. The processor 510 may correspond to processor 125 of FIG. 1.

Figure 6:
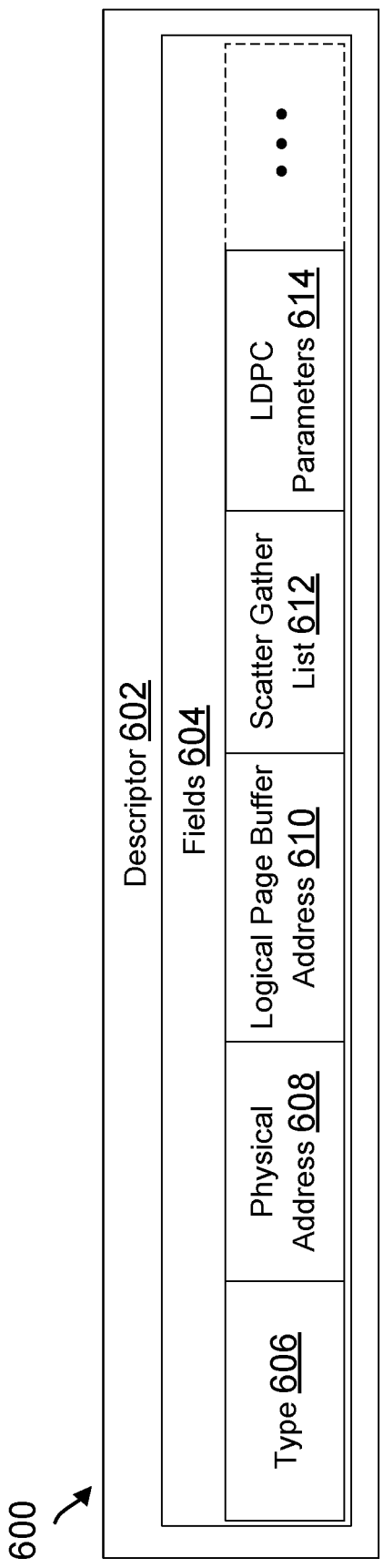
FIG. 6 is a conceptual diagram illustrating an example of a descriptor that is communicated in the example two-chip system of FIG. 5.

When the controller 506 reads or writes data in memory (e.g. in one or more of the dies 512) in response to a host command 517 (e.g. a read command, a write command, etc.) from the host device 507, the controller 506 may construct and send a descriptor 518 identifying information associated with the host command 517 to the processor 510 in the slave chip, which in turn processes the descriptor and accordingly communicates with the die(s) to sense or program the data in the cells. FIG. 6 illustrates an example 600 of a descriptor 602 (e.g. the descriptor 518 that the controller 506 constructs and sends to the processor 510). The descriptor 602 may include multiple fields 604 including various information associated with the host command 517. For example, the descriptor 602 may include a descriptor type 606 (e.g. an opcode or other indicator of the type of host command, for instance, read, write, erase, etc.), a physical address 608 corresponding to a die, block, and/or page from which the data is to be sensed, programmed, erased, etc., a logical page buffer address 610 (e.g. an address for a buffer in the volatile memory 508 to temporarily store data read from the die(s)), a scatter gather list 612 identifying one or more sources (e.g. buffers in the volatile memory 508) containing write data and one or more targets (e.g. dies 512) for storing the respective write data, and LDPC parameters 614 (e.g. that the processor 510 may use to identify LDPC codes). The descriptor 602 may also include other information associated with the host command 517.

For each host command 517 received from host device 507, the controller 506 may construct and send a descriptor 518, 602 to the processor 510 to be stored in a memory segment 520 of the volatile memory 514. For instance, each memory segment 520 may include 64 or 128 bytes of memory (or some other amount of memory) in which the processor may store each descriptor received from the controller. While the example of FIG. 5 illustrates eight memory segments 520 in volatile memory 514, the volatile memory may include any number of memory segments (e.g. 1000 memory segments or some other number up to the maximum size of the volatile memory 514). The controller 506 may also send an instruction 522 to the processor 510 including an index, address, or other indicator of the memory segment 520 in which the processor is to store each descriptor 518, 602. For instance, as illustrated in the example of FIG. 5, the controller may instruct the processor to store a first descriptor associated with a read command (e.g. a read descriptor 524) in a first memory segment or slot of the volatile memory 514, a second descriptor associated with another read command in a second memory segment or slot of the volatile memory 514, a third descriptor associated with a third read command in a third memory segment of the volatile memory, a fourth read descriptor in a fourth memory segment of the volatile memory, a first descriptor associated with a write command (e.g. a write descriptor 526) in a fifth memory segment of the volatile memory, and a second write descriptor in a sixth memory segment of the volatile memory. In other examples, the controller may instruct the processor to store any number of read, write, or other types of descriptors (e.g. erase descriptors) in the memory segments 520 in a predetermined or arbitrary order determined by the controller (e.g. based on order of receipt of host commands, priority, etc.). The controller may also send the processor a mailbox message (not shown) indicating a location in the volatile memory 514 where each descriptor is stored, which the processor may store in a mailbox queue (e.g. in an order of priority).

During execution of each host command 517, the processor 510 may obtain one of the descriptors 518, 602 from the volatile memory 514 (e.g. from the memory segment 520 indicated in a next mailbox message in the mailbox queue). The processor may then process that descriptor 518, 602 by identifying the information stored in the various fields 604 of the descriptor (e.g. the opcode, physical address, LDPC parameters, etc.) and constructing and sending a command to the die(s) 512 to perform operations (e.g. sense, program, etc.) accordingly. However, the descriptors may include static information common across the various descriptors. For instance, each read descriptor 524 may include the same descriptor type 606 or opcode corresponding to a read, the same logical page buffer address 610, the same LDPC parameters 614, or other identical information. Therefore, the controller 506 may inefficiently construct and the processor may inefficiently receive and process redundant information in various descriptors 518, 602, leading to significant latency in completing execution of the host commands.

In attempt to optimize the storage device in one example, when the controller 506 sends instructions 522 to the processor 510 to store the descriptors 518, 602 in volatile memory 514, the controller may select the memory segments 520 in which the descriptors are to be stored based on descriptor type. For example, the controller may instruct the processor to store descriptors 518, 602 in different memory segments of the volatile memory 514 such that the first half (e.g. four consecutive memory segments) includes read descriptors 524 and the second half (e.g. four consecutive memory segments) of the volatile memory 514 include write descriptors 526. The controller 506 may thus consider such instructions 522 as effectively subdividing the volatile memory 514 based on descriptor type. However, without coordination between the master chip 502 and slave chip 504 of such intent behind the instructions, the processor may not consider the descriptors to be stored based on descriptor type. For instance, absent receiving a message from the controller indicating such subdivisions based on descriptor type, the processor may consider the instructions 522 for each descriptor 518, 602 as including merely arbitrarily selected memory segments by the controller based on free availability in memory. As a result, the processor 510 may process the descriptors in each memory segment irrespective of descriptor type, leading to inefficient processing of redundant information and increased latency. For instance, the processor may repeatedly obtain or re-generate static information (e.g. read opcodes, write opcodes, logical page buffers, LDPC parameters, etc.) common to multiple descriptors.

Figure 7:
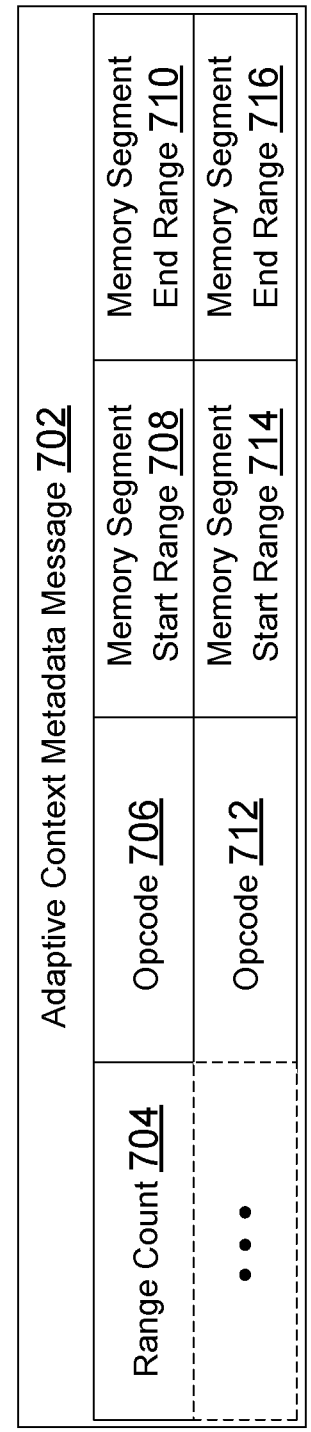
FIG. 7 is a conceptual diagram illustrating an example of an adaptive context metadata message that is communicated in the example two-chip system of FIG. 5.

Accordingly, to optimize the storage device in another example, the controller 506 may construct and send a message 528 to the processor 510 indicating the aforementioned subdivisions by mapping the descriptor type(s) of the descriptors 518, 602 to different memory segments 520 of the volatile memory 514. FIG. 7 illustrates an example 700 of an adaptive context metadata message 702 (e.g. message 528) that the controller 506 may provide to the processor 510 during initialization of the storage device 102 and prior to sending descriptors 518, 602 and instructions 522. The message may include a range count 704 indicating a number of descriptor types 606 (or a number of ranges of memory segments 520 in which the descriptors are to be stored), an opcode 706, 712 corresponding to each descriptor type 606 in the range count 704 (e.g. read, write, erase, etc.), and a memory segment start range 708, 714 and memory segment end range 710, 716 that identify a range of indices indicating the memory segments 520 associated with each opcode 706, 712. While FIG. 7 shows two opcodes 706, 712 and memory segment start ranges 708, 714 and end ranges 710, 716, the number of opcodes and memory segment start and end ranges may change in accordance with the value of the range count 704. For instance, if the controller intends to subdivide the volatile memory 514 for two descriptor types (e.g. read and write), there may be two opcodes and two memory segment start and end ranges corresponding to a range count of 2 as illustrated in FIG. 7. In another example, if the controller intends to subdivide the volatile memory 514 for three descriptor types (e.g. read, write, and erase), there may be three opcodes and three memory segment start and end ranges corresponding to a range count of 3. There may be any number of descriptor types 606 or range counts, and thus opcodes and start and end ranges, in the message 528, 702.

For instance, in the example illustrated in FIG. 5, the controller 506 may intend to subdivide the volatile memory 514 such that the first through fourth memory segments of the volatile memory 514 are to store read descriptors 524 (for future read commands) and such that the fifth and sixth memory segments of the volatile memory 514 are to store write descriptors 526 (for future write commands). Accordingly, during initialization, the controller may communicate this intent to the processor 510 by constructing the message 528, 702 to include the value 2 for the range count 704 (corresponding to two descriptor types in this example: read and write), the value "read" or some other indicator associated with a read command for the first opcode 706, index 0 for the first memory segment start range 708 (corresponding to the first memory segment), index 3 for the first memory segment end range 710 (corresponding to the fourth memory segment), the value "write" or some other indicator associated with a write command for the second opcode 712, index 4 for the second memory segment start range 714 (corresponding to the fifth memory segment), and index 5 for the second memory segment end range 716 (corresponding to the sixth memory segment). After providing the message 528, 702 to the processor, the controller may provide descriptors 518 and instructions 522 to store each descriptor in the selected memory segments of the volatile memory 514.

As a result, after the processor 510 stores the descriptors 518 in the volatile memory 514 according to the instructions 522, the processor may obtain and process each descriptor to execute a corresponding host command 517 based on the descriptor type 606 of each descriptor as identified from the message 528, 702. For example, when the processor 510 obtains a read descriptor 524 from the second memory segment and processes the read descriptor as described above, the processor may refrain from reading the fields 604 of the read descriptor that contain static information present in multiple read descriptors such as the opcode, logical page buffer address, and LDPC parameters, if the processor previously identified this information in another read descriptor. For instance, after reading a first read descriptor 524 from the volatile memory 514, the processor may store in another location of the volatile memory 514 (or in a different memory) the static information obtained, and refer to that information when processing second and subsequent read descriptors 524. The processor may operate similarly for write descriptors 526 or other descriptors associated with different descriptor types.

Similarly, the controller 506 may construct and transmit descriptors 518, 602 based on the descriptor type 606 of each descriptor as indicated in the message 528, 702. For example, when the controller constructs a read descriptor 524 for one of the first through fourth memory segments and transmits the descriptor as described above, the controller may refrain from populating the fields 604 of the descriptor that contain static information present in multiple read descriptors such as the opcode, logical page buffer address, and LDPC parameters, if the controller previously populated this information in another read descriptor. The controller may operate similarly for write descriptors 526 or other descriptors associated with different descriptor types.

Therefore, based on the message 528, 702, the processor 510 may generate LDPC codes or other information once during the current run-time of the storage device 102, rather than repeatedly during the processing of each descriptor, and may refrain from repeatedly obtaining information from the descriptors that may be duplicated across multiple descriptors 518, 602. For instance, the processor 510 may generate LDPC codes while processing a first descriptor stored in one of the memory segments allocated for read descriptors, and refrain from generating the same LDPC codes while processing subsequent descriptors stored in other memory segments allocated for read descriptors. Moreover, based on the message 528, 702, the controller 506 may avoid constructing and transmitting duplicate information to the processor 510 for each descriptor 518, 602. For instance, the controller 506 may identify and include the LDPC parameters in the field of a first descriptor to be stored in one of the memory segments allocated for read descriptors, and refrain from identifying and including the LDPC parameters in the field of subsequent descriptors to be stored in other memory segments allocated for read descriptors. As a result, the latency in executing multiple commands may be reduced and performance of the storage device improved.

Figure 8:
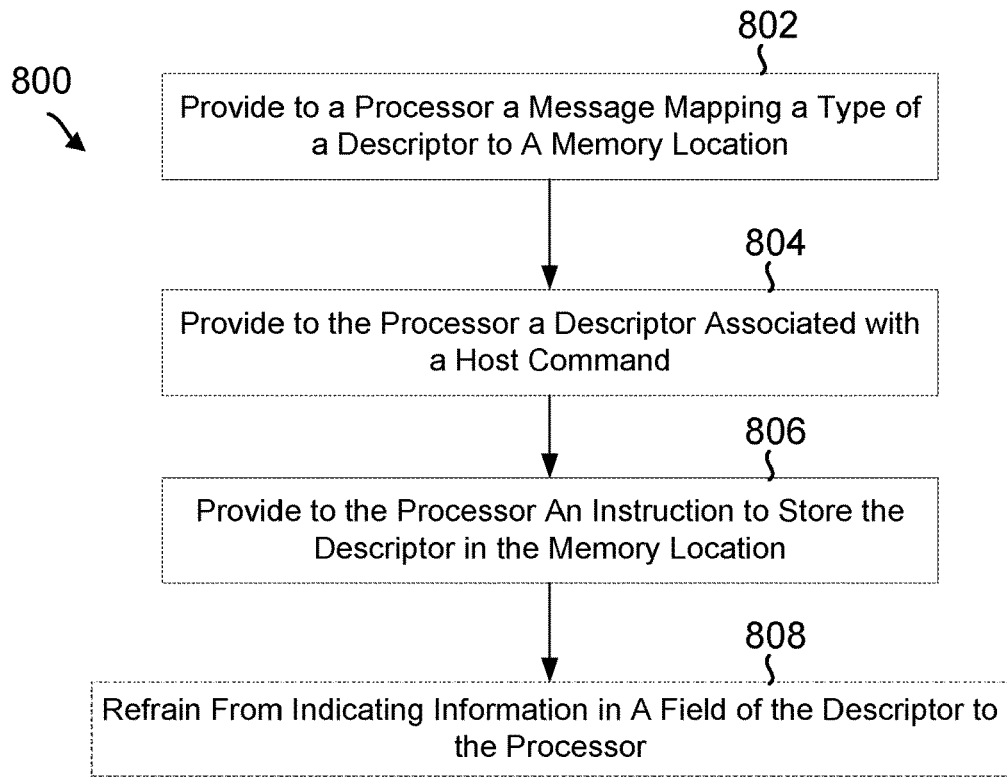
FIG. 8 is a flow chart illustrating an example method for optimizing performance based on an adaptive context metadata message in the storage device of FIG. 1.

FIG. 8 illustrates an example flow chart 800 of a method for optimizing performance based on an adaptive context metadata message. For example, the method can be carried out in a storage device 102 such as the one illustrated in FIG. 1. Each of the steps in the flow chart can be controlled using the controller as described below (e.g. controller 123, 506), or by some other suitable means. Optional aspects are illustrated in dashed lines.

As represented by block 802, the controller may provide to a processor a message mapping a type of a descriptor to a memory location. The memory location may be one of a plurality of memory locations of a memory (e.g. a volatile memory such as, but not limited to, an SRAM). The storage device may comprise a master chip and a slave chip, where the master chip comprises the controller and the slave chip comprises the processor. The plurality of memory locations may comprise a plurality of memory segments in the memory (e.g. in the volatile memory). For example, referring to FIGS. 5-7, the controller 506 in the master chip 502 may provide to the processor 510 in the slave chip 504 a message 528, 702 mapping a type 606 of a descriptor 518, 602 to a memory location (e.g. memory segment 520) in the volatile memory 514.

In one example, the message may comprise a range count indicating a number of mappings in the message. The message may also comprise an opcode, and the opcode may correspond to the type of the descriptor. The message may further comprise an index associated with the one of the memory locations. For example, referring to FIGS. 5-7, the message 528, 702 may comprise a range count 704 indicating a number of mappings (e.g. a number of opcodes, memory segment start ranges, or memory segment end ranges), an opcode 706, 712 corresponding to the type 606 of the descriptor 518, 602, and an index (e.g. memory segment start range 708, memory segment end range 710, memory segment start range 714, or memory segment end range 716) associated with the memory segment 520.

In another example, the message may map the type of the descriptor to at least two of the memory locations or a range of the memory locations, and the message comprises a plurality of indices associated with the at least two of the memory locations or the range of the memory locations. For instance, referring to FIGS. 5-7, the message 528, 702 may map the type of the descriptor 518, 602 (e.g. type 606 corresponding to opcode 706 or opcode 712) to at least two of the memory segments 520 or a range of the memory segments 520 (e.g. as indicated by memory segment start range 708 and memory segment start range 710, such as indices 0-3 for read descriptors 524, or as indicated by memory segment start range 714 and memory segment end range 716, such as indices 4 and 5 for write descriptors 526). In a further example, the message may map the type of the descriptor to a first one (or range) of the memory locations, and the message may further map another type of another descriptor to a second one (or range) of the memory locations. For instance, referring to FIGS. 5-7, the message 528, 702 may map the type of the descriptor 518, 602 (e.g. type 606 corresponding to opcode 706) to a first one or range of the memory segments 520 (e.g. as indicated by memory segment start range 708 and memory segment start range 710, such as indices 0-3 for read descriptors 524), and the message 528, 702 may map another type of another descriptor 518, 602 (e.g. type 606 corresponding to different opcode 712) to a second one or range of the memory segments 520 (e.g. as indicated by memory segment start range 714 and memory segment end range 716, such as indices 4 and 5 for write descriptors 526).

As represented by block 804, the controller may provide to the processor a descriptor associated with a host command. The descriptor may comprise a plurality of fields each indicating information for processing the host command. For example, referring to FIGS. 5 and 6, the controller 506 may provide to the processor 510 a descriptor 518, 602 associated with a host command 517 received from the host device 507 (such as a read descriptor 524 or a write descriptor 526). The descriptor 518, 602 may comprise a plurality of fields 604 each indicating information for processing the host command 517. For example, the information may include the type 606, the physical address 608, the logical page buffer address 610, the scatter gather list 612, the LDPC parameters 614, or other information that the processor 510 may consider when processing the host command 517 as described above.

As represented by block 806, the controller may provide to the processor an instruction to store the descriptor in the memory location. The controller may provide to the processor the descriptor and the instruction to store the descriptor after providing the message. For example, referring to FIGS. 5-7, after providing the message 528, 702, the controller 506 may provide to the processor 510 the descriptor 518 associated with the host command 517 and the instruction 522 to store the descriptor 518 in one of the memory segments 520. Based on the message 528, 702, the controller may select and include in the instruction 522 an indicator (e.g. an index, an address, or other identifier) of the memory segment 520 in which the processor may store the descriptor 518, 602. For instance, in the example message described above where indices 0-3 of the volatile memory 514 are mapped or allocated to read descriptors and indices 4-5 of the volatile memory 514 are mapped or allocated to write descriptors, the controller 506 may select any of the first four memory segments to store the descriptor 518, 602 if such descriptor is a read descriptor 524 and any of the other two memory segments to store the descriptor 518, 602 if such descriptor is a write descriptor 526. The processor 510 may store the descriptor in the selected memory segment accordingly.

Finally, as represented by block 808, the controller may refrain from indicating information in a field of the descriptor to the processor. For example, referring to FIGS. 5-7, the controller 506 may refrain from indicating to the processor 510 information in at least one of the fields 604 of the descriptor 518, 602 based on the message 528, 702. For instance, in the example message described above, indices 0-3 of the volatile memory 514 may be mapped or allocated to read descriptors 524 and indices 4-5 of the volatile memory 514 may be mapped or allocated to write descriptors 526. In such case, when the controller 506 constructs and sends a first read descriptor to the processor 510 (e.g. for a host read command), the controller 506 may identify static information such as opcodes (e.g. descriptor type 606), logical page buffer address 610, LDPC parameters 614, or other information common between multiple read descriptors, populate that information in the corresponding fields 604 when constructing the first read descriptor, and send that information in the first read descriptor to the processor 510 to be stored in one of the memory segments 520 associated with indices 0-3. When the controller 506 subsequently constructs and sends a subsequent read descriptor 524 (e.g. for another host read command), the controller 506 may refrain from re-identifying or re-transmitting the static information common between multiple read descriptors. For instance, the controller may leave those corresponding fields 604 blank when constructing the subsequent read descriptor, and the controller may send the partially populated, subsequent read descriptor to the processor 510 to be stored in another of the memory segments 520 associated with indices 0-3. The controller may similarly repeat the above process for write descriptors 526 (e.g. for write commands) for first and subsequent write descriptors respectively.

Figure 9:
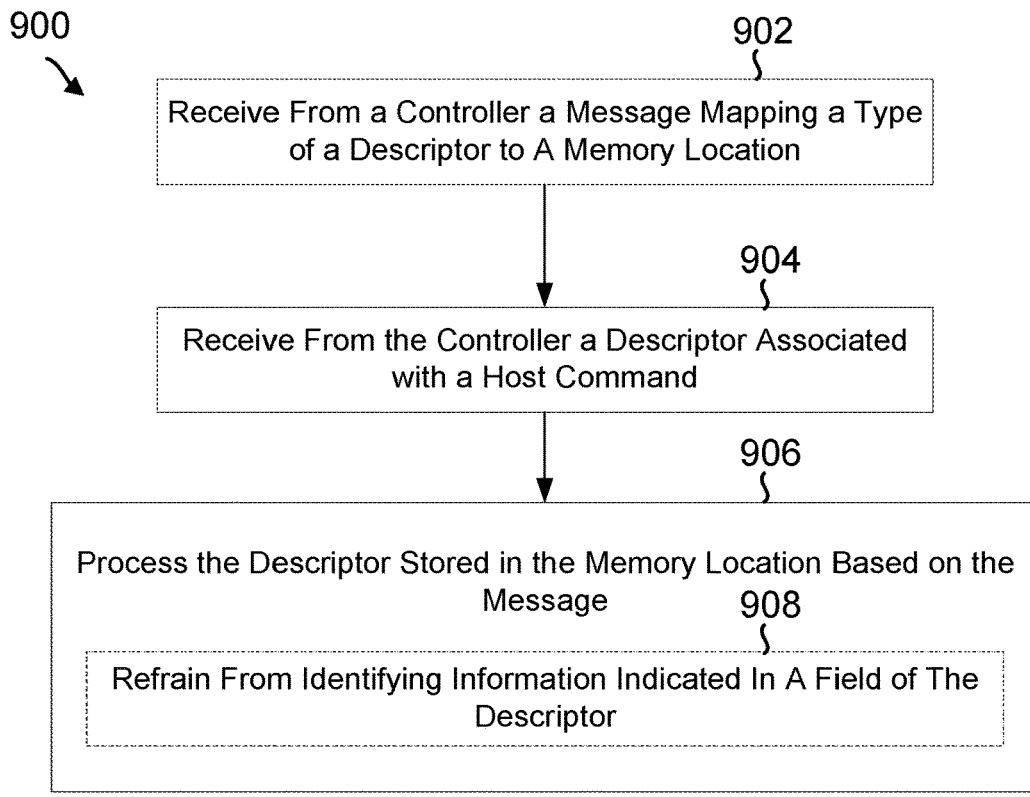
FIG. 9 is a flow chart illustrating another example method for optimizing performance based on an adaptive context metadata message in the storage device of FIG. 1.

FIG. 9 illustrates an example flow chart 900 of another method for optimizing performance based on an adaptive context metadata message. For example, the method can be carried out in a storage device 102 such as the one illustrated in FIG. 1. Each of the steps in the flow chart can be implemented using the processor as described below (e.g. processor 125, 510), or by some other suitable means. Optional aspects are illustrated in dashed lines.

As represented by block 902, the processor may receive from a controller a message mapping a type of a descriptor to a memory location. The memory location may be one of a plurality of memory locations of a memory (e.g. a volatile memory such as, but not limited to, an SRAM). The storage device may comprise a master chip and a slave chip, where the master chip comprises the controller and the slave chip comprises the processor. The plurality of memory locations may comprise a plurality of memory segments in the memory (e.g. in the volatile memory). For example, referring to FIGS. 5-7, the processor 510 in the slave chip 504 may receive from the controller 506 in the master chip 502 a message 528, 702 mapping a type 606 of a descriptor 518, 602 to a memory location (e.g. memory segment 520) in the volatile memory 514.

In one example, the message may comprise a range count indicating a number of mappings in the message. The message may also comprise an opcode, and the opcode may correspond to the type of the descriptor. The message may further comprise an index associated with the one of the memory locations. For example, referring to FIGS. 5-7, the message 528, 702 may comprise a range count 704 indicating a number of mappings (e.g. a number of opcodes, memory segment start ranges, or memory segment end ranges), an opcode 706, 712 corresponding to the type 606 of the descriptor 518, 602, and an index (e.g. memory segment start range 708, memory segment end range 710, memory segment start range 714, or memory segment end range 716) associated with the memory segment 520.

In another example, the message may map the type of the descriptor to at least two of the memory locations or a range of the memory locations, and the message comprises a plurality of indices associated with the at least two of the memory locations or the range of the memory locations. For instance, referring to FIGS. 5-7, the message 528, 702 may map the type of the descriptor 518, 602 (e.g. type 606 corresponding to opcode 706 or opcode 712) to at least two of the memory segments 520 or a range of the memory segments 520 (e.g. as indicated by memory segment start range 708 and memory segment start range 710, such as indices 0-3 for read descriptors 524, or as indicated by memory segment start range 714 and memory segment end range 716, such as indices 4 and 5 for write descriptors 526). In a further example, the message may map the type of the descriptor to a first one (or range) of the memory locations, and the message may further map another type of another descriptor to a second one (or range) of the memory locations. For instance, referring to FIGS. 5-7, the message 528, 702 may map the type of the descriptor 518, 602 (e.g. type 606 corresponding to opcode 706) to a first one or range of the memory segments 520 (e.g. as indicated by memory segment start range 708 and memory segment start range 710, such as indices 0-3 for read descriptors 524), and the message 528, 702 may map another type of another descriptor 518, 602 (e.g. type 606 corresponding to different opcode 712) to a second one or range of the memory segments 520 (e.g. as indicated by memory segment start range 714 and memory segment end range 716, such as indices 4 and 5 for write descriptors 526).

As represented by block 904, the processor may receive from the controller a descriptor associated with a host command. The descriptor may comprise a plurality of fields each indicating information for processing the host command. For example, referring to FIGS. 5 and 6, the processor 510 may receive from the controller 506 a descriptor 518, 602 associated with a host command 517 received from the host device 507 (such as a read descriptor 524 or a write descriptor 526). The descriptor 518, 602 may comprise a plurality of fields 604 each indicating information for processing the host command 517. For example, the information may include the type 606, the physical address 608, the logical page buffer address 610, the scatter gather list 612, the LDPC parameters 614, or other information that the processor 510 may consider when processing the host command 517 as described above.

As represented by block 906, the processor may process the descriptor stored in the memory location based on the message. For example, referring to FIGS. 5-7, the processor 510 may process the descriptor 518, 602 stored in one of the memory segments 520 (e.g. in order of a next command or descriptor to be processed in a mailbox queue) depending on the type 606 (e.g. opcode 706, 712) of the descriptor (e.g. whether the descriptor is a read descriptor 524 or a write descriptor 526) or depending on whether the descriptor is a first or subsequently processed descriptor of the same type 606 (e.g. whether the read descriptor is a first or subsequently processed read descriptor, or whether the write descriptor is a first or subsequently processed write descriptor). For instance, as represented by block 908, the processor may refrain from identifying information indicated in a field of the descriptor. For example, the processor may refrain from identifying the information indicated in at least one of the fields in response to a determination that the message indicates the one of the memory locations or in response to a determination that the descriptor is stored in the one of the memory locations indicated in the message.

For example, referring to FIGS. 5-7, the processor 510 may refrain from identifying information in at least one of the fields 604 of the descriptor based on the message 528, 702. For instance, from the example message described above, the processor may determine that indices 0-3 of the volatile memory 514 are mapped or allocated to read descriptors 524 and indices 4-5 of the volatile memory 514 are mapped or allocated to write descriptors 526. Based on the determination, when the processor 510 processes a first read descriptor 524 (e.g. to execute a host read command) stored in any of the memory segments associated with indices 0-3, the processor 510 may identify static information such as opcodes (e.g. descriptor type 606), logical page buffer address 610, LDPC parameters 614, or other information common between multiple read descriptors, consider the information identified in the corresponding fields 604 of the first read descriptor (e.g. to identify LDPC codes, etc.), and construct and send a sense command to the dies 512 to read data from the cells in the memories 516. When the processor 510 subsequently processes a subsequent read descriptor 524 stored in another of the memory segments associated with indices 0-3 (e.g. to execute another host read command), the processor 510 may refrain from re-identifying or re-considering the static information common between multiple read descriptors. For instance, the processor may skip parsing and identifying duplicative information in the corresponding fields 604 such as the opcode, logical page buffer address, LDPC parameters, etc., refrain from re-identifying the LDPC codes again from the same LDPC parameters, and more quickly construct and send the sense command to the dies 512. The processor may similarly repeat the above process for write descriptors 526 (e.g. to execute host write commands) for first and subsequent write descriptors respectively.

Accordingly, the storage device described in the present disclosure enables simplified processing by a processor in a slave chip of high-frequency messages (e.g. descriptors) provided by a controller in a master chip. For example, the controller may initialize and transmit data (e.g. LDPC parameters, etc.) up-front, and similarly the processor may process such data up-front, for an initial read command or write command rather than for every read command or write command. Such approach may reduce host command execution latency in master and slave chips, as well as in other two-chip implementations with statically allocated messaging systems (e.g. either using hardware or software). As a result, performance may be increased by a large percentage for storage devices with high-performance drive configurations, as well as for storage devices with value-stream drive configurations (e.g. configurations which may have a reduction in instruction execution frequency or lower NAND bus speeds compared to high-performance drive configurations).

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a processor;
   a memory including a plurality of memory locations;
   a controller configured to provide to the processor,
   a descriptor associated with a host command, and
   a message mapping a type of the descriptor to a first one of the plurality of memory locations, and a different type of another descriptor to a second one of the plurality of memory locations, wherein the message comprises a range count indicating a number of mappings in the message.

2. The storage device of claim 1, further comprising:
   a master chip and a slave chip, wherein the master chip comprises the controller and the slave chip comprises the processor.

3. The storage device of claim 1, wherein the memory comprises a static random access memory (SRAM), and wherein the plurality of memory locations comprises a plurality of memory segments in the SRAM.

4. The storage device of claim 1, wherein the message comprises an opcode.

5. The storage device of claim 4, wherein the opcode corresponds to the type of the descriptor.

6. The storage device of claim 1, wherein the message maps the type of the descriptor to at least two of the plurality of memory locations, and wherein the message comprises a plurality of indices associated with the at least two of the plurality of memory locations.

7. A storage device, comprising:
a processor;
a memory including a plurality of memory locations; and
a controller configured to provide to the processor a message mapping a type of a descriptor to a first one of the plurality of memory locations, and a different type of another descriptor to a second one of the plurality of memory locations, wherein the message comprises a range count indicating a number of mappings in the message;
wherein the processor is configured to process the descriptor in the first one of the plurality of memory locations based on the message, the descriptor being associated with a host command.

8. The storage device of claim 7, wherein the descriptor comprises a plurality of fields each indicating information for processing the host command.

9. The storage device of claim 8, wherein the processor is configured to refrain from identifying the information indicated in at least one of the plurality of fields in response to a determination that the message indicates the first one of the plurality of memory locations.

10. The storage device of claim 8, wherein the controller is configured to refrain from indicating the information in at least one of the plurality of fields to the processor.

11. The storage device of claim 7, wherein the message comprises an opcode corresponding to the type of the descriptor and an index associated with the first one of the plurality of memory locations.

12. The storage device of claim 7, wherein the message maps the type of the descriptor to a range of the plurality of memory locations, and wherein the message comprises a plurality of indices associated with the range of the plurality of memory locations.

13. The storage device of claim 7, wherein the message maps the type of the descriptor to a first range of the plurality of memory locations, wherein the message further maps the different type of the another descriptor to a second range of the plurality of memory locations.

14. A storage device, comprising:
a processor;
a memory including a plurality of memory locations;
a controller configured to provide to the processor,
a message mapping a type of a descriptor to a first one of the plurality of memory locations, and a different type of another descriptor to a second one of the plurality of memory locations, wherein the message comprises a range count indicating a number of mappings in the message, and
an instruction to store the descriptor in the first one of the plurality of memory locations, the descriptor being associated with a host command.

15. The storage device of claim 14, wherein the descriptor comprises a field indicating information for processing the host command, and wherein the processor is configured to refrain from identifying the information indicated in the field in response to a determination that the descriptor is stored in the first one of the plurality of memory locations.

16. The storage device of claim 14, wherein the descriptor comprises a field indicating information for processing a host command, and wherein the controller is configured to refrain from indicating the information in the field to the processor.

17. The storage device of claim 14, wherein the message comprises an opcode corresponding to the type of the descriptor, and a plurality of indices associated with a range of the plurality of memory locations.

18. The storage device of claim 14, wherein the controller is configured to provide to the processor the descriptor to be stored in the first one of the plurality of memory locations after providing the message.

\* \* \* \* \*